United States Patent Office 3,214,433
Patented Oct. 26, 1965

3,214,433
NOVEL PYRIDO[3,4-b]INDOLES
Jackson B. Hester, Jr., Portage, Mich., assignor to The Upjohn Company, Kalamazoo, Mich., a corporation of Delaware
No Drawing. Filed Mar. 23, 1964, Ser. No. 354,120
5 Claims. (Cl. 260—296)

This invention pertains to novel pyrido[3,4-b]indoles and to a novel process for the preparation thereof. More particularly, the invention pertains to novel 2,3,4,9-tetrahydro-6-alkoxy-1-pyridyl-1H-pyrido[3,4-b]indoles of the formula:

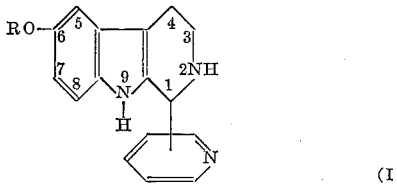

and novel 4,9-dihydro-6-alkoxy-1-(4-pyridyl)-3H-pyrido[3,4-b]indoles of the formula:

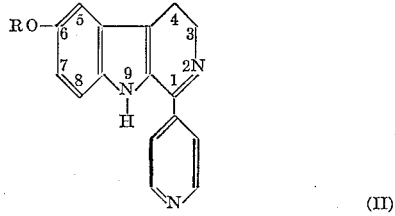

in which formulas R is alkyl of one to four carbon atoms, inclusive, for example, methyl, ethyl, propyl, butyl, and isomeric forms thereof.

The novel 2,3,4,9-tetrahydro-6-alkoxy-1-pyridyl-1H-pyrido[3,4-b]indoles of Formula I and 4,9-dihydro-6-alkoxy-1-(4-pyridyl)-3H-pyrido[3,4-b]indoles of Formula II are amines, and exist in the nonprotonated or free base form, or in the protonated or acid addition salt form depending on the pH of the environment. They form stable protonates, i.e., acid addition salts, on neutralization with acids, for example, hydrochloric, hydrobromic, sulfuric, phosphoric, nitric acetic, benzoic, salicylic, glycolic, succinic, nicotinic, tartaric, maleic, malic, pamoic, methanesulfonic, cyclohexanesulfamic, picric, and lactic acids, and the like. These acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula I and Formula II compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155. They also form salts with trichloroacetic acid which are useful as herbicides, for example, against Johnson grass, yellow foxtail, green foxtail, Bermuda grass, and quackgrass.

The Formula I and Formula II compounds of this invention also form salts with penicillins. These salts have solubility characteristics which cause them to be useful in the isolation and purification of penicillins, particularly benzyl penicillin. Said salts can be formed either by neutralization of the free base form of a compound of Formula I or Formula II with the free acid form of a penicillin, or by a metathetical exchange of the anion of an acid addition salt of a Formula I or Formula II compound, for example, the chloride ion of a hydrochloride, with the anionic form of a penicillin.

The novel 2,3,4,9 - tetrahydro-6-alkoxy-1-pyridyl-1H-pyrido[3,4-b]indoles of Formula I are prepared by a process which comprises mixing a pyridinecarboxaldehyde of the formula:

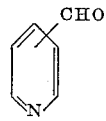
(III)

for example, picolinaldehyde, nicotinaldehyde, and iso-nicotinaldehyde, with a tryptamine of the formula:

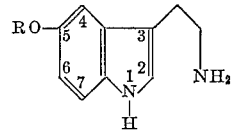
(IV)

wherein R is as given above, in the presence of an acidic aqueous medium.

The tryptamine of Formula IV can be employed either as the free base or as an acid addition salt (e.g., the hydrochloride), the acid addition salt form being somewhat preferred. The tryptamine and pyridinecarboxaldehyde reactants can be employed in equimolar amounts, or an excess of either reactant can be employed if so desired, such as up to about 50% excess. Advantageously, the aqueous reaction mixture is maintained within a pH range of between about 3.0 and about 6.5, preferably between about 3.8 and about 6.2. The mixture can be maintained at the desired pH by conventional means, illustratively, by the use of an aqueous buffer, examples of which are acetate buffers and phosphate buffers. The acidic aqueous medium can include inert organic solvents, preferably water-miscible solvents such as methanol, ethanol, and the like. The preferred temperature range is from about 10° to about 50° C., particularly from about 20° to about 35° C. The time required for completing the reaction depends upon such factors as the reaction temperature, the particular reactants employed, the relative amounts of reactants, thoroughness of mixing, and the like. Therefore, it will be understood that the optimum reaction time will vary for each set of reaction conditions. Ordinarily, reaction times ranging from about one day to about ten days are suitable. When the reaction has been completed, the 2,3,4,9-tetrahydro-6-alkoxy-1-pyridyl-1H-pyrido[3,4-b]indole of Formula I can be obtained from the mixture either as an acid addition salt or as the free base, using conventional means such as filtration to obtain an acid addition salt or basification to obtain the free base, followed by recrystallization if desired. The free base can be converted to any desired acid addition salt by neutralization with an acid, e.g., any of the acids given above.

When the Formula III aldehyde reaction in the above process is isonicotinaldehyde, there is obtained a novel 4,9 - dihydro - 6 - alkoxy - 1 - (4 - pyridyl) - 3H - pyrido-[3,4-b]indole of Formula II in admixture with the corresponding 2,3,4,9-tetrahydro - 6 - alkoxy - 1 - (4 - pyridyl)-1H-pyrido[3,4-b]indole of Formula I, the alkoxy group being the same in both compounds. These compounds can be separated from each other by conventional means, illustratively, by chromatography or by basification of the reaction mixture and fractional crystallization of the resulting mixture of free bases from a suitable solvent such as methanol or ethanol. Each of the free bases so obtained can be purified, e.g., by recrystallization or converted to an acid addition salt by neutralization with an acid, e.g., any of the acids given above.

The tryptamines of Formula IV can be prepared by known procedures, for example, by the procedure disclosed in U.S. Patent 2,870,162.

The following examples are illustrative of the process and products of the present invention, but are not to be construed as limiting.

EXAMPLE 1

*2,3,4,9 - tetrahydro - 6 - methoxy - 1 - (2 - pyridyl) - 1H-pyrido[3,4-b]indole free base and hydrochloride thereof*

To a solution of 5-methoxytryptamine hydrochloride (10.0 g.; 44.3 millimoles) in 250 ml. of buffer (prepared by dissolving 3.0 g. of acetic acid and 4.1 g. of anhydrous sodium acetate in 500 ml. of water) was added 5.2 g. (48.5 millimoles) of picolinaldehyde. The mixture was stored in the dark, under nitrogen, at about 25° C. for six days. The resulting yellow 2,3,4,9-tetrahydro-6-methoxy-1-(2-pyridyl)-1H-pyrido[3,4-b]indole hydrochloride was recovered by filtration (retaining the filtrate for further processing), washed with water, suspended in dilute ammonium hydroxide, and the suspension was stirred with diethyl ether. The ether layer was washed with saturated sodium chloride solution, dried with anhydrous potassium carbonate, filtered, and concentrated to dryness under reduced pressure. The residue was dissolved in anhydrous ethanol and the solution containing 2,3,4,9-tetrahydro - 6 - methoxy - 1 - (2 - pyridyl) - 1H - pyrido[3,4-b]indole free base was acidified with hydrogen chloride. The resulting precipitate was recrystallized from aqueous ethanol. There was thus obtained 3.25 g. of 2,3,4,9 - tetrahydro - 6 - methoxy - 1 - (2 - pyridyl) - 1H-pyrido[3,4-b]indole hydrochloride; M.P. 244–245° C. (dec.).

The filtrate from the reaction mixture was made ammoniacal and extracted with diethyl ether. The ether extract was worked up as described above. There was thus obtained an additional 1.98 g. of 2,3,4,9-tetrahydro-6-methoxy-1-(2-pyridyl)-1H-pyrido[3,4-b]indole hydrochloride; M.P. 243–245° C. (dec.). An analytical sample prepared by a second recrystallization from aqueous ethanol had the same melting point.

Ultraviolet spectrum (water): λ max. 218 and 267 m$\mu$ ($\epsilon$=28,700 and 10,880, respectively), with inflections at 260, 294 and 306 m$\mu$ ($\epsilon$=9,770, 5,640 and 3,450, respectively).

*Analysis.*—Calcd. for $C_{17}H_{18}ClN_3O$: C, 64.65; H, 5.74; Cl, 11.23; N, 13.31. Found: C, 64.39; H, 5.79; Cl, 10.84; N, 13.16.

The above hydrochloride inhibits the enzyme pseudocholinesterase.

The above hydrochloride (1.0 g.) was mixed with 50 ml. of 1 N sodium hydroxide and the mixture was extracted with diethyl ether. The ether extract was dried and evaporated to dryness to obtain pure 2,3,4,9-tetrahydro - 6 - methoxy - 1 - (2 - pyridyl) - 1H - pyrido[3,4-b]indole free base.

Following the procedure of Example 1, but adding to the ethanol solution of the free base, diethyl ether solutions of hydrogen bromide, sulfuric acid, phosphoric acid, benzoic acid, acetic acid, maleic acid, and cyclohexanesulfamic acid in place of hydrogen chloride, there are obtained the hydrobromic, sulfuric, phosphoric, benzoic, acetic, maleic, and cyclohexanesulfamic acid addition salts of 2,3,4,9-tetrahydro-6-methoxy-1-(2-pyridyl)-1H-pyrido[3,4-b]indole.

Following the procedure of Example 1, but substituting 5-ethoxytryptamine, 5-propoxytryptamine, and 5-sec.butoxytryptamine for 5-methoxytryptamine, there are obtained 2,3,4,9 - tetrahydro - 6 - ethoxy - 1 - (2 - pyridyl)-1H - pyrido[3,4-b]indole, 2,3,4,9 - tetrahydro - 6 - propoxy - 1 - (2 - pyridyl) - 1H - pyrido[3,4-b]indole, and 2,3,4,9 - tetrahydro - 6 - sec.butoxy - 1 - (2 - pyridyl)-1H-pyrido[3,4-b]indole, respectively, both as free bases and as hydrochlorides.

EXAMPLE 2

*2,3,4,9 - tetrahydro - 6 - methoxy - 1 - (3 - pyridyl) - 1H-pyrido[3,4-b]indole free base and hydrochloride thereof*

Following the procedure of Example 1, but substituting nicotinaldehyde for picolinaldehyde, there are obtained 2,3,4,9 - tetrahydro - 6 - methoxy - 1 - (3 - pyridyl) - 1H-pyrido[3,4-b]indole free base and the hydrochloride thereof.

Following the procedure of Example 2, but substituting 5-isopropoxytryptamine and 5-butoxytryptamine for 5-methoxytryptamine, there are obtained 2,3,4,9-tetrahydro-6 - isopropoxy - 1 - (3 - pyridyl) - 1H - pyrido[3,4-b]-indole and 2,3,4,9 - tetrahydro - 6 - butoxy - 1 - (3 - pyridyl) - 1H - pyrido[3,4-b]indole, respectively, both as free bases and as hydrochlorides.

EXAMPLE 3

*4,9 - dihydro - 6 - methoxy - 1 - (4 - pyridyl) - 3H-pyrido[3,4-b]indole free base; 2,3,4,9-tetrahydro-6-methoxy - 1 - (4 - pyridyl) - 1H - pyrido[3,4-b]indole free base; and hydrochlorides thereof*

A. 4,9-DIHYDRO-6-METHOXY-1-(4-PYRIDYL)-3H-PYRIDO-[3,4-b]INDOLE FREE BASE AND HYDROCHLORIDE THEREOF

To a solution of 5-methoxytryptamine hydrochloride (10.0 g.; 44.3 millimoles) in 250 ml. of buffer (prepared by dissolving 3.0 g. of acetic acid and 4.1 g. of anhydrous sodium acetate in 500 ml. of water) was added 5.2 g. (48.5 millimoles) of isonicotinaldehyde. The mixture was stored in the dark, under nitrogen, at about 25° C. for six days. The mixture was made ammoniacal and the resulting semicrystalline solid was recovered by filtration, washed with water, and extracted with ethyl acetate. The extract was dried with anhydrous potassium carbonate, filtered, and concentrated to yield a semicrystalline residue. Fractional crystallization of this material from methanol yielded two crops of 4,9-dihydro-6-methoxy-1-(4-pyridyl)-3H-pyrido[3,4-b]indole free base, the first crop weighing 0.875 g. and having a melting point of 206–208° C., and the second crop weighting 0.526 g. and having a melting point of 201–204° C. An analytical sample prepared by three recrystallizations from methanol had a melting point of 209–210.5° C.

Ultraviolet spectrum (ethanol): λ max. 217 and 345 m$\mu$ ($\epsilon$=30,500 and 13,600, respectively), with inflections at 260 and 272 m$\mu$ ($\epsilon$=8,500 and 8,250, respectively).

Ultraviolet spectrum (0.01 N ethanolic sulfuric acid): 212 and 394 m$\mu$ ($\epsilon$=25,250 and 21,500, respectively) with an inflection at 230 m$\mu$ ($\epsilon$=17,950).

*Analysis.*—Calcd. for $C_{17}H_{15}N_3O$: C, 73.63; H, 5.45; N, 15.15. Found: C, 73.58; H, 5.12; N, 14.98.

A portion of the above free base was dissolved in ethanol and the solution was acidified with hydrogen chloride. The resulting 4,9-dihydro-6-methoxy-1-(4-pyridyl)-3H-pyrido[3,4-b]indole hydrochloride was recovered by filtration.

Following the same procedure, but adding to the ethanol solution of the free base, diethyl ether solutions of hydrogen bromide, sulfuric acid, phosphoric acid, benzoic acid, acetic acid, maleic acid, and cyclohexanesulfamic acid in place of hydrogen chloride, there are obtained the hydrobromic, sulfuric, phosphoric, benzoic, acetic, maleic, and cyclohexanesulfamic acid addition salts of 4,9-dihydro-6-methoxy-1-(4-pyridyl)-3H-pyrido[3,4-b]indole.

B. 2,3,4,9-TETRAHYDRO - 6 - METHOXY-1-(4-PYRIDYL)-1H-PYRIDO[3,4-b]INDOLE FREE BASE AND HYDROCHLORIDE THEREOF

The methanol mother liquors from the fractional crystallization procedure of Part A were acidified with hydrogen chloride. The resulting precipitate was crystallized from aqueous ethanol to obtain 1.323 g. of material having a melting point of 207–210° C. (dec.). Three recrystallizations of this material from aqueous ethanol afforded 2,3,4,9 - tetrahydro - 6 - methoxy - 1 - (4-pyridyl) - 1H-pyrido[3,4-b]indole hydrochloride monohydrate having a melting point of 218° C. (dec.).

Ultraviolet spectrum (water): λ max. 217 and 267 mμ (ε=28,800 and 10,230, respectively) with inflections at 294 and 306 Mμ (ε=5,260 and 3,430, respectively).

Analysis.—Calcd. for $C_{17}H_{18}ClN_3O \cdot H_2O$: C, 61.16; H, 6.04; Cl, 10.62; N, 12.59; $H_2O$, 5.40. Found: C, 61.02; H, 6.14; Cl, 10.67; N, 12.31; $H_2O$, 5.80.

Anhydrous 2,3,4,9-tetrahydro-6-methoxy-1-(4-pyridyl)-1H-pyrido[3,4-b]indole hydrochloride can be obtained by placing the monohydrate over phosphorus pentoxide and maintaining the system under reduced pressure for 24 hours.

The above hydrochloride monohydrate (0.25 g.) was mixed with 15 ml. of 1 N sodium hydroxide and the mixture was extracted with diethyl ether. The ether extract was dried and evaporated to obtain pure 2,3,4,9-tetrahydro-6-methoxy-1-(4-pyridyl)-1H-pyrido[3,4-d]indole free base.

Following the procedure of Example 3, but substituting 5-ethoxytryptamine for 5-methoxytryptamine, there are obtained: first, in accordance with Part A, 4,9-dihydro-6-ethoxy-1-(4-pyridyl)-3H-pyrido[3,4-b]indole free base and its hydrochloride; and then, in accordance with Part B, 2,3,4,9-tetrahydro-6-ethoxy-1-(4-pyridyl)-1H-pyrido[3,4-b]indole free base and its hydrochloride.

In like manner, by substituting 5-isobutoxytryptamine for 5-methoxytryptamine, there are obtained: first, in accordance with Part A, 4,9-dihydro-6-isobutoxy-1-(4-pyridyl)-3H-pyrido[3,4-b]indole free base and its hydrochloride; and then, in accordance with Part B, 2,3,4,9-tetrahydro - 6-isobutoxy-1-(4-pyridyl)-1H-pyrido[3,4-b]indole free base and its hydrochloride.

I claim:

1. A compound selected from the group consisting of the free base form and acid addition salts of a compound of the formula:

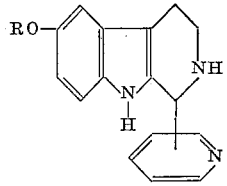

wherein R is alkyl of one to four carbon atoms, inclusive.

2. 2,3,4,9 - tetrahydro - 6 - methoxy-1-(2-pyridyl)-1H-pyrido[3,4-b]indole hydrochloride.

3. 2,3,4,9 - tetrahydro - 6 - methoxy-1-(4-pyridyl)-1H-pyrido[3,4-b]indole hydrochloride.

4. A compound selected from the group consisting of the free base form and acid addition salts of a compound of the formula:

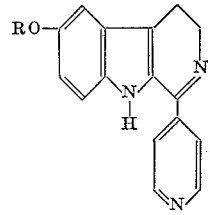

wherein R is alkyl of one to four carbon atoms, inclusive.

5. 4,9 - dihydro-6-methoxy-1-(4-pyridyl)-3H-pyrido[3,4-b]indole free base.

References Cited by the Examiner
UNITED STATES PATENTS 3,071,589   1/63   Archer _____ 260—296

WALTER A. MODANCE, *Primary Examiner.*

JOHN D. RANDOLPH, *Examiner.*